June 1, 1954 — C. A. SCHUTT — 2,679,810
TRANSFER UNIT FOR CONVEYERS
Filed Feb. 12, 1951 — 2 Sheets-Sheet 1

Inventor
Clarence A. Schutt

Inventor
Clarence A. Schutt

Patented June 1, 1954

2,679,810

UNITED STATES PATENT OFFICE 2,679,810

TRANSFER UNIT FOR CONVEYERS

Clarence A. Schutt, Nashville, Tenn.

Application February 12, 1951, Serial No. 210,476

5 Claims. (Cl. 104—93)

The present invention relates to new and useful improvements in conveyor systems generally, and more particularly pertains to a novel transfer unit for transferring article carriers from one conveyor to a further conveyor.

The primary object of the present invention is to feed article carriers to a conveyor therefor at a rate corresponding to the load capacity of the conveyor.

Another important object of the present invention is to stop the operation of a conveyor when the feed of the article carriers thereto has been interrupted.

Still another important object of the present invention is to provide a means for transferring article carriers from a first conveyor to a second conveyor in such a manner that the second conveyor will be always loaded to a predetermined load capacity irrespective of the rate of operation or the loading of the first conveyor.

A meritorious feature of the present invention resides in the construction of the gates and the means actuated by the fingers on the receiving conveyor to alternately dispose the gates in carrier interrupting positions.

Another important feature of the present invention resides in the electric switch means for controlling the operation of the conveyor, together with the pivotal mounting of the discharge gate for actuating the electric switch means in response to engagement of the discharge gate by an article carrier.

Still other important features of the present invention reside in the simplicity of construction, and the durability and efficiency of the machine in its intended use.

These, together with various ancillary objects and features of the invention which will become apparent as the following description proceeds, are attained by the present invention, a preferred embodiment of which has been illustrated by way of example only in the accompanying drawings, wherein:

Figure 6 is a diagragrammatic view of the electrical system.

Figure 1:
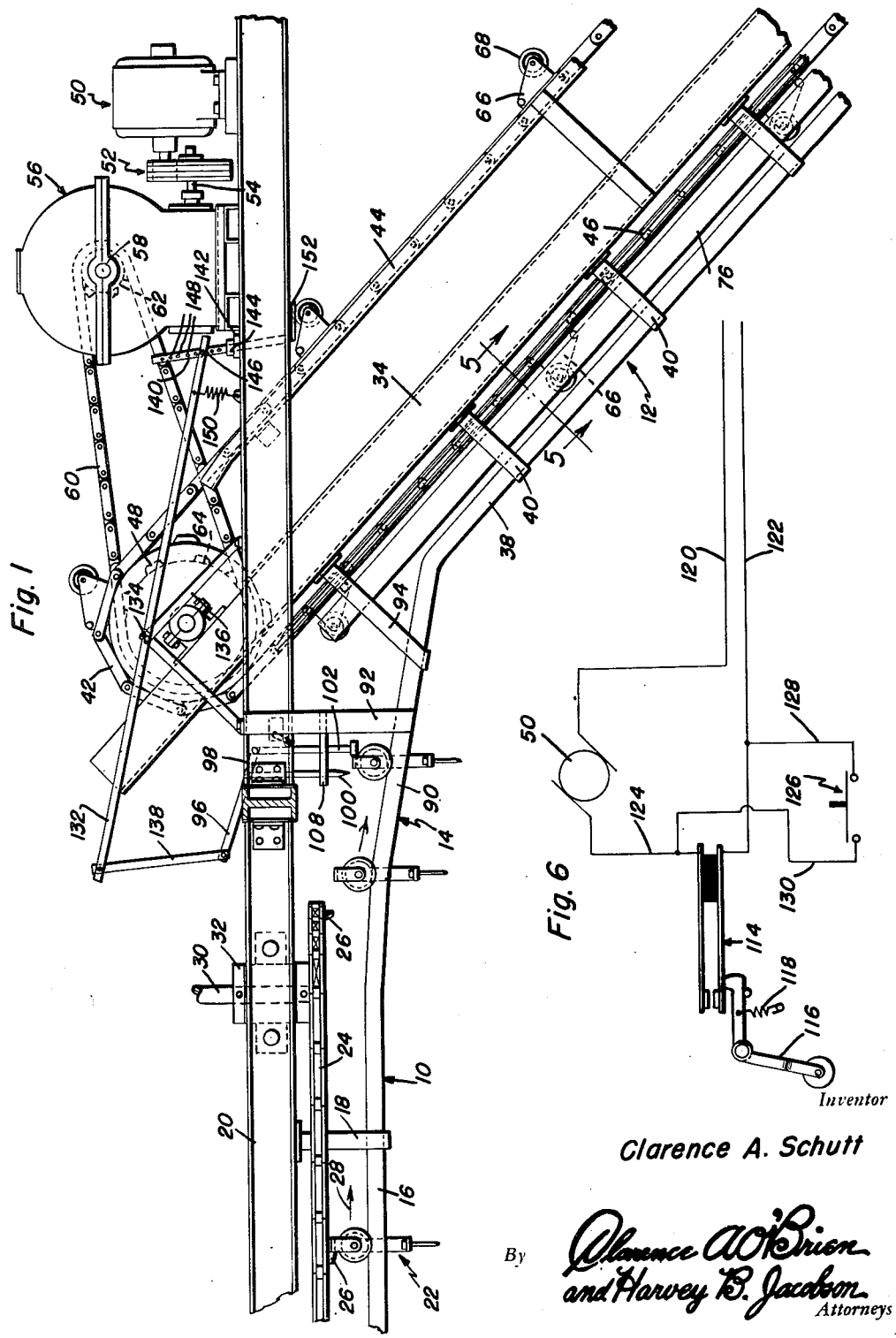
Figure 1 is a side elevational view of the invention, the conveyors being broken away and certain hidden details of the invention being shown in dotted outline.

Reference is now made more specifically to the accompanying drawings, wherein like numerals designate similar parts throughout the various views, and in which there is designated generally a horizontal conveyor and an inclined conveyor 10 and 12, respectively, with a transfer unit 14 interposed between such conveyors.

The conveyor 10 comprises a support rail 16 supported by a strap 18 below a structural frame member 20. The support rail 16 guidingly supports article carriers designated generally at 22. The conveyor 10 also includes an endless chain 24 having parallel spaced horizontal flights, one of which flights is disposed immediately above the rail 16 and parallel thereto. Lugs 26 depend from and are spaced at intervals along the chain 24, and are engageable with the carriers 22 to move the latter along the rail 16 in the direction indicated by the arrow 28. Means is provided for supporting and driving the chain 24 (only partially shown), which means include sprockets disposed at the opposite ends of the chain 24 over which the latter is entrained, one of such sprockets being mounted on and driven by a shaft 30 that is journaled through a suitable bearing 32 mounted on the structural frame member 20.

The conveyor 12 is somewhat analogous to the conveyor 10 and comprises spaced inclined frame members 34 and 36 which are supported and secured to the frame 20 in any suitable manner. An inclined support rail 38 is supported below and in parallel relation to the members 34 and 36 by straps 40 carried by the member 34, the rail being disposed directly below the space between the members 34 and 36.

An endless chain 42 is provided having spaced upper and lower inclined flights 44 and 46, respectively, and the upper end of the chain 42 is entrained over a drive sprocket 48 that is suitably mounted for rotation above the member 20 by means not shown. Although not shown, it will be understood that the lower end of the chain 42 is entrained over a further sprocket.

Means is provided to drive the chain 42, which includes an electric motor 50 drivingly connected by belt and pulley means 52 to the input shaft 54 of a speed reducer 56. The output shaft 58 of the speed reducer is drivingly connected to the sprocket 48 by a drive chain 60 entrained over a sprocket 62 on the shaft 58 and a sprocket 64 fixed to and coaxial with the sprocket 48.

Figure 5:
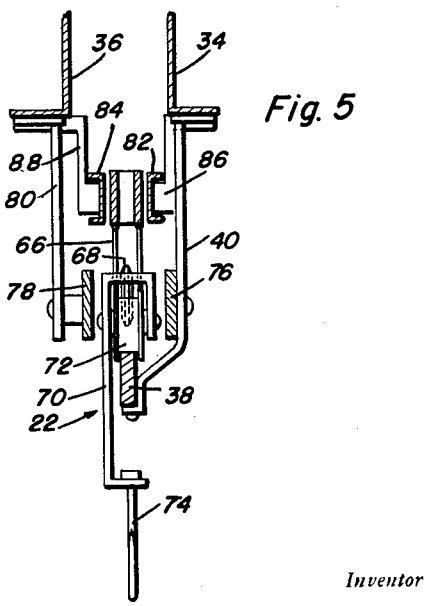
Figure 5 is an enlarged sectional detail view taken upon the plane of the section line 5—5 of Figure 1.

Fixed at spaced intervals along the chain 42 are laterally extending fingers 66 provided with rollers 68. It will be noted that the fingers 66 project downwardly from the lower flight 46 of the chain and are disposed in close proximity to the rail 38. As best shown in Figure 5, the fingers 66 and the rollers, when moving along the lower flight 46 are disposed in the travel path of the carriers 22 which are guidingly supported on the rail 38, the arrangement being such that a carrier 22 will rest against the rollers 68 and move downwardly on the rail 38 at the same speed with which the chain 42 travels. It will be appreciated that the carriers 22 gravitate on the inclined rail 38 towards the right as shown in Figure 1.

As best shown in Figure 5, the carriers 22 comprise a body 70 having a grooved roller 72 journaled in its upper end that engages on the top of the rail 38, and the body 70 is provided with a hook 74 at its lower end for supporting articles such as meat or the like, not shown.

Means is provided to prevent the carriers from being displaced from the rail 38 which includes parallel guide strips 76 and 78, respectively, disposed on opposite sides of the travel path of the upper ends of the carriers 22, the strip 76 being secured to the strap 40 and the strip 78 being secured to strap 80 depending from the member 36. In addition, the chain 42 is retained against lateral movement by parallel guide strips 82 and 84 disposed on the opposite sides of the flight 46 of the chain and suitably fastened to the members 34 and 36, respectively, by brackets 86 and 88.

The transfer unit 14 comprises an inclined support rail 90 connecting the rails 16 and 38 and along which the carriers 22 may move by gravitation from the rail 16 to the rail 38, the rail 90 being supported from the member 20 and 34, respectively, by straps 92 and 94.

The unit 14 further includes means for controlling the movement of the carriers along the rail 90. Such means includes an actuating lever 96 pivotally mounted at 98 on the member 20. A safety gate 100 and a discharge gate 102 are pivotally supported on the lever 96 at positions 104 and 106, respectively, on opposite sides of the pivot 98, the arrangement being such that the lever 96 may be rocked between positions in which one of the gates is disposed in the travel path of a carrier 22 on the rail 90 while the other gate is not disposed in the travel path of the carrier 22. A plate 108 is mounted on the strap 92, which plate 108 is provided with a guide aperture 110 through which the safety gate 100 slidably extends to prevent lateral movement of the safety gate, and also to guide the vertical movement thereof. In addition, the plate 108 is provided with a guide slot 112 through which the discharge gate 102 slidably extends to permit a limited amount of vertical swinging movement thereof.

An electric switch 114 is mounted on the member 20, which switch 114 is provided with an outwardly extending actuating arm 116, the arm 116 being spring-pressed by a spring 118 (see Figure 6) to move the arm 116 outwardly from the switch 114 to open the latter, and also to urge the arm 116 to bear on the discharge gate 102 to swing the latter to the left, as shown in Figures 1–4, the arrangement being such that swinging the discharge gate 102 to the right moves the arm 116 to close the switch 114.

The switch 114 controls the operation of the motor 50, as will be seen in Figure 6. The reference numerals 120 and 122 designate electrical power leads, the power lead 120 being connected to one terminal of the electric motor 50, while the lead 122 is connected to one terminal of the electric switch 114. The other terminal of the electric switch 114 is connected to the other terminal of the electric motor 50 by connecting electrical lead 124, the arrangement being such that closure of the switch 114 will energize the electric motor 50 from the leads 120 and 122. A manually operated switch 126 is provided which is connected to the leads 122 and 124 by conductors 128 and 130, respectively, the arrangement being such that the switches 114 and 128 are in electrical parallel, so that the motor 50 may be energized manually when the switch 114 is open.

Means is provided to rock the lever 96 in timed relation to the movement of the fingers 66 passing a predetermined position. Such means includes an elongated lever 132 pivoted intermediate its ends at 134 to a support 136 carried by the member 20. A link 138 has its opposite extremities pivotally connected to the levers 96 and 132 so that rocking movement of the lever 132 will be imparted to the lever 96. An elongated rod 140 is mounted in a suitable guide 142 carried by the member 20 for longitudinal reciprocation. The rod 140 is substantially vertical, and is provided with a stop 144 to limit downward movement of the same. The rod 140 is pivotally secured to the lever 132 by a pin 146 extending through the lever 132 and a selected aperture of a series of apertures 148 provided in the rod 140 above the stop 144. As thus far described, it will be seen that vertical reciprocation of the rod 140 imparts a rocking movement to the lever 132. In addition, it will be seen that when the end of the lever 132 that is secured to the rod 140 moves downwardly, the lever 96 is rocked so that the discharge gate 102 moves downwardly while the safety gate 100 moves upwardly. The lever 132 is yieldingly urged to a position in which further downward movement of the rod 140 is limited by the stop 144 by a coiled tension spring 150 connecting the lever 132 and the member 20.

The lower end of the rod 140 is provided with a foot 152 that is disposed in the travel path of the rollers 68 on the fingers 66 as the latter mentioned elements move along the upper flight 44 of the chain 42. The relation of the foot 152 to the rollers 68 is such that during upward movement of the rollers 68, the rollers 68 will contact the underside of the foot 152 and cam the latter upwardly so as to move the rod 140 upwardly through the guide 142. The upward movement of the rod 140 by engagement of rollers 68 with the foot 152 is of a sufficient amount to rock the lever 96 to a position in which the safety gate 100 is lowered into the travel path of the carriers 22 on the rail 90 and the discharge gate 102 is raised above the travel path of such carriers.

Figure 2:
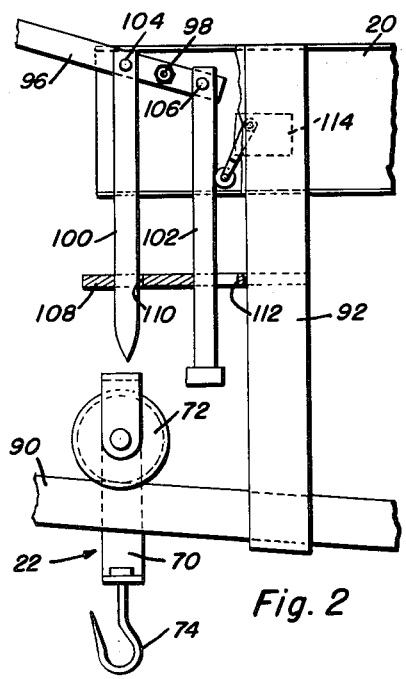
Figures 2–4 are fragmentary detail views of the construction of the gates and the mounting thereof, portions of these views being shown in section and hidden construction shown in dotted outline; these views illustrating sequential steps in the operation of the gates.
Figure 3:
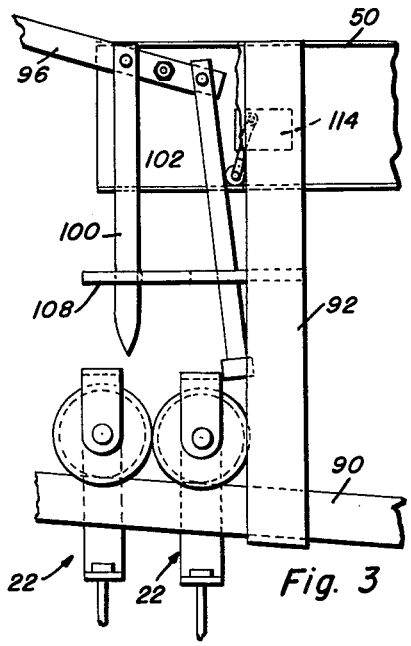
Figure 4:
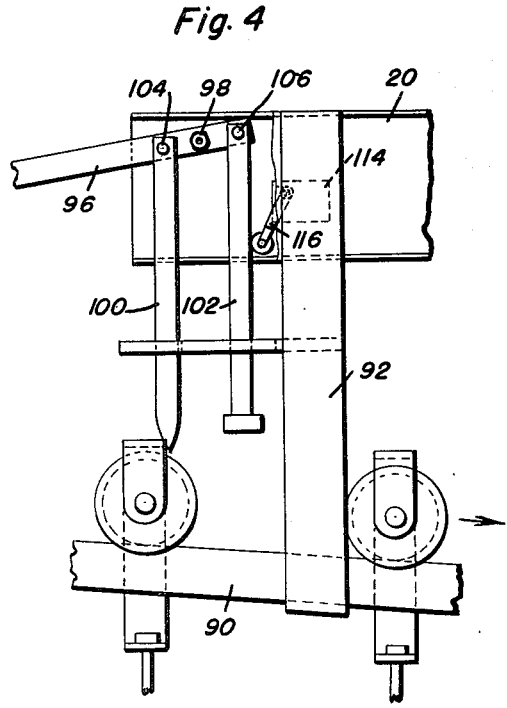

It is believed that the operation of the present invention will be readily understood. For an understanding of the operation of the present invention, attention is directed to the Figures 2–4. The normal position of the gates 100 and 102 is shown in Figure 2, it being recalled that the spring 150 urges the discharge gate into a position intercepting carriers 22 moving along the rail 90. Thus, in Figure 2, the gates are shown in their normal position with a carrier 22 shown passing under the gate 100 and approaching the discharge gate 102. In Figure 3, the carrier 22 is shown as having moved into a position engaging the discharge gate 102, the latter having stopped further progress of the carrier 22. However, it is to be noted that the carrier 22 exerts sufficient force against the discharge gate to swing the latter into a position moving the arm 116 of the electrical switch 114 to a position closing the latter. Upon closing the switch 114, the motor 59 operates to move the chain 42 so as to cause the roller 68 of one of the fingers to raise the rod 140 by coaction of the roller with the foot of the rod 140, so that the discharge gate 102 is raised to the position shown in Figure 4, it being noted that raising of the discharge gate permits the carrier engaging the discharge gate to move free of the discharge gate, while the safety gate 100 has been lowered to prevent the movement of a subsequent carrier thereby. After the rod 140 has been raised a sufficient amount so that the discharge gate releases the carrier engaging the same, the inertia of the driving means for the chain 42 carries the chain a sufficient further distance to free the roller 68 engaging the foot from the latter, whereupon the spring 150 returns the transfer unit to the position shown in Figure 2, with the operation of the motor 59 having ceased. It will be appreciated that the apparatus is in condition for a repeat operation.

From the foregoing, the construction and operation of the device will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. Means for feeding article carriers to a conveyor assembly of the type including a conveyor rail for guidingly supporting carriers and an endless conveyor having spaced fingers thereon for engaging carriers on the conveyor rail; said means comprising an inclined carrier support rail adapted to have its lower end connected to the conveyor rail as a continuation thereof, said support rail being adapted to guidingly support carriers thereon for descent by gravitation, a safety gate and a discharge gate mounted adjacent the junction of said conveyor and support rails, means supporting the gates for alternate movement thereof into spaced positions adapted to intercept carriers descending on the support rail, means yieldingly urging the discharge gate into carrier intercepting position, said discharge gate being mounted for limited pivotal movement upon engagement with a carrier, electric means adjacent said discharge gate responsive to engagement of a carrier with the discharge gate to cause movement of the endless conveyor, and means responsive to movement of a finger through a predetermined position to move the discharge gate from the intercepting position.

2. Means for transferring article carriers between a pair of conveyor assemblies of the type including a conveyor rail and an endless conveyor having spaced fingers thereon for engaging carriers on the rail; said means comprising an inclined carrier support rail adapted to have its opposite ends connected to the rails of a pair of conveyor assemblies, said support rail being adapted to guidingly support carriers thereon for descent by gravitation, a safety gate and a discharge gate disposed above said support rail, means supporting the gates for alternate movement thereof into spaced positions adapted to intercept carriers descending on the support rail from the conveyor assembly connected to the upper end of the support rail, said discharge gate being normally disposed in intercepting position, said discharge gate being supported for limited pivotal movement upon engagement with a carrier, electric means including a switch adjacent the discharge gate responsive to engagement of a carrier with the discharge gate to cause movement of the endless conveyor of the conveyor assembly connected to the lower end of the support rail, and means responsive to movement of a finger of the last-mentioned assembly through a predetermined position to move the discharge gate from its carrier intercepting position.

3. A conveyor system comprising a pair of conveyor assemblies, each of which includes a conveyor rail and an endless conveyor having spaced fingers thereon for engaging article carriers on the rail, means for transferring article carriers from one of the assemblies to the other, said last means comprising an inclined carrier support rail having its opposite ends connected to the rails of the assemblies, said support rail being adapted to guidingly support carriers thereon for descent by gravitation, a safety gate and a discharge gate, means supporting the gates for alternate movement into spaced positions adapted to intercept carriers descending on the support rail from the conveyor assembly connected to the upper end of the support rail, said discharge gate being normally disposed in intercepting position, and being supported for limited pivotal movement upon engagement by a carrier, electric means including a switch adjacent the discharge gate responsive to engagement of a carrier with the discharge gate to cause movement of the endless conveyor of the conveyor assembly connected to the lower end of the support rail, and means responsive to movement of a finger of the last-mentioned endless conveyor through a predetermined position to move the discharge gate from its intercepting position.

4. In a conveyor system, a support rail for article carriers, an endless conveyor having spaced fingers thereon, a portion of the travel path of the fingers being parallel to the support rail for engaging carriers thereon, a safety gate and a discharge gate, means for supporting the gates for alternate movement into positions adapted to intercept the movement of article carriers on the support rail, said last means including a lever connected at spaced positions to the gates and pivotally supported intermediate such spaced positions, means yieldingly urging pivotal movement of the lever towards a position in which the discharge gate is in intercepting position, and means disposed adjacent the travel path of the fingers and operable by the movement of one of the fingers thereby to urge pivotal movement of the lever in opposition to the last means and normally inoperative means for moving the endless conveyor, and electric switch means operatively associated with the discharge gate for rendering said last means operative, said discharge gate being responsive to engagement thereof by a carrier to actuate such switch means.

5. In a conveyor system, an inclined support rail adapted to guidingly support an article carrier for gravitational descent therealong, an endless conveyor having spaced fingers thereon adapted to engage carriers on the support rail, means for feeding carriers onto the support rail in timed relation to movement of the fingers past a predetermined position, said last means including a lever disposed above said support rail, a safety gate and a discharge gate mounted in spaced positions on said lever, said lever being pivotally mounted intermediate the spaced positions, said gates being selectively and alternately positionable in the travel path of carriers descending on the support rail adjacent the upper end of the latter, electrical means responsive to engagement of a carrier with the discharge gate to permit movement of the endless conveyor, said electrical means including a switch mounted adjacent said discharge gate, said discharge gate being pivotally mounted on said lever and contacting said switch and actuating said electrical means upon engagement with a carrier, means operatively connected to said lever and disposed in the path of movement of the conveyor fingers to rock said lever and move said gates.

References Cited in the file of this patent

UNITED STATES PATENTS

| Number | Name | Date |
|---|---|---|
| 533,184 | Svenson | Jan. 29, 1895 |
| 881,212 | Washington | Mar. 10, 1908 |
| 1,396,804 | Wood | Nov. 15, 1921 |
| 1,556,724 | Shaffer | Oct. 13, 1925 |